United States Patent
Streete et al.

(10) Patent No.: US 12,386,631 B2
(45) Date of Patent: Aug. 12, 2025

(54) SELF-CONTAINED WORKER ORCHESTRATOR IN A DISTRIBUTED SYSTEM

(71) Applicant: DELL PRODUCTS L.P., Round Rock, TX (US)

(72) Inventors: Jonathan Streete, South San Francisco, CA (US); Kevin Marks, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 17/969,987

(22) Filed: Oct. 20, 2022

(65) Prior Publication Data

US 2024/0134656 A1 Apr. 25, 2024
US 2024/0231842 A9 Jul. 11, 2024

(51) Int. Cl.
*G06F 9/445* (2018.01)
*G06F 8/61* (2018.01)
*G06F 8/65* (2018.01)
*G06F 8/654* (2018.01)
*G06F 8/656* (2018.01)
*G06F 9/4401* (2018.01)
*G06F 9/455* (2018.01)
*G06F 11/14* (2006.01)
*H04L 29/06* (2006.01)

(52) U.S. Cl.
CPC ............ *G06F 9/44505* (2013.01); *G06F 8/61* (2013.01); *G06F 8/654* (2018.02); *G06F 9/4406* (2013.01); *G06F 11/1433* (2013.01)

(58) Field of Classification Search
CPC ........ G06F 9/44505; G06F 8/654; G06F 8/61; G06F 9/4406; G06F 11/1433; G06F 11/3409; G06F 9/4411; G06F 11/3065; G06F 8/65; G06F 11/302; G06F 11/3093; G06F 9/461; G06F 9/5016; G06F 9/5027; G06F 9/5011
See application file for complete search history.

(56) References Cited

U.S. PATENT DOCUMENTS

| | | | |
|---|---|---|---|
| 10,599,420 B2 * | 3/2020 | Quin | H04L 63/123 |
| 10,944,691 B1 | 3/2021 | Raut et al. | |
| 11,379,214 B2 * | 7/2022 | Nachimuthu | G06F 8/656 |
| 11,429,399 B2 | 8/2022 | Vigil et al. | |
| 2020/0143057 A1 * | 5/2020 | Limonciello | G06F 21/57 |
| 2021/0034350 A1 * | 2/2021 | Chen | G06N 5/02 |
| 2021/0081213 A1 * | 3/2021 | Kondapi | G06F 8/61 |
| 2021/0240589 A1 * | 8/2021 | Samuel | G06F 8/65 |

* cited by examiner

*Primary Examiner* — Thuy Dao
(74) *Attorney, Agent, or Firm* — Larson Newman, LLP

(57) ABSTRACT

A system is provided for monitoring, managing, and maintaining a distributed network of information handling systems. The system includes a first information handling system and a second information handling system. The first information handling system creates a software bundle. The second information handling system receives the bundle from the first information handling system, and executes an executable included in the bundle. The executable changes a configuration of the second information handling system from a first operating state to a second operating state.

18 Claims, 4 Drawing Sheets

SELF-CONTAINED WORKER ORCHESTRATOR IN A DISTRIBUTED SYSTEM

FIELD OF THE DISCLOSURE

This disclosure generally relates to information handling systems, and more particularly relates to providing a self-contained worker orchestrator in a distributed system of information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system may be provided for monitoring, managing, and maintaining a distributed network of information handling systems. The system may include a first information handling system and a second information handling system. The first information handling system may create a software bundle. The second information handling system may receive the bundle from the first information handling system, and execute an executable included in the bundle. The executable may change a configuration of the second information handling system from a first operating state to a second operating state.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
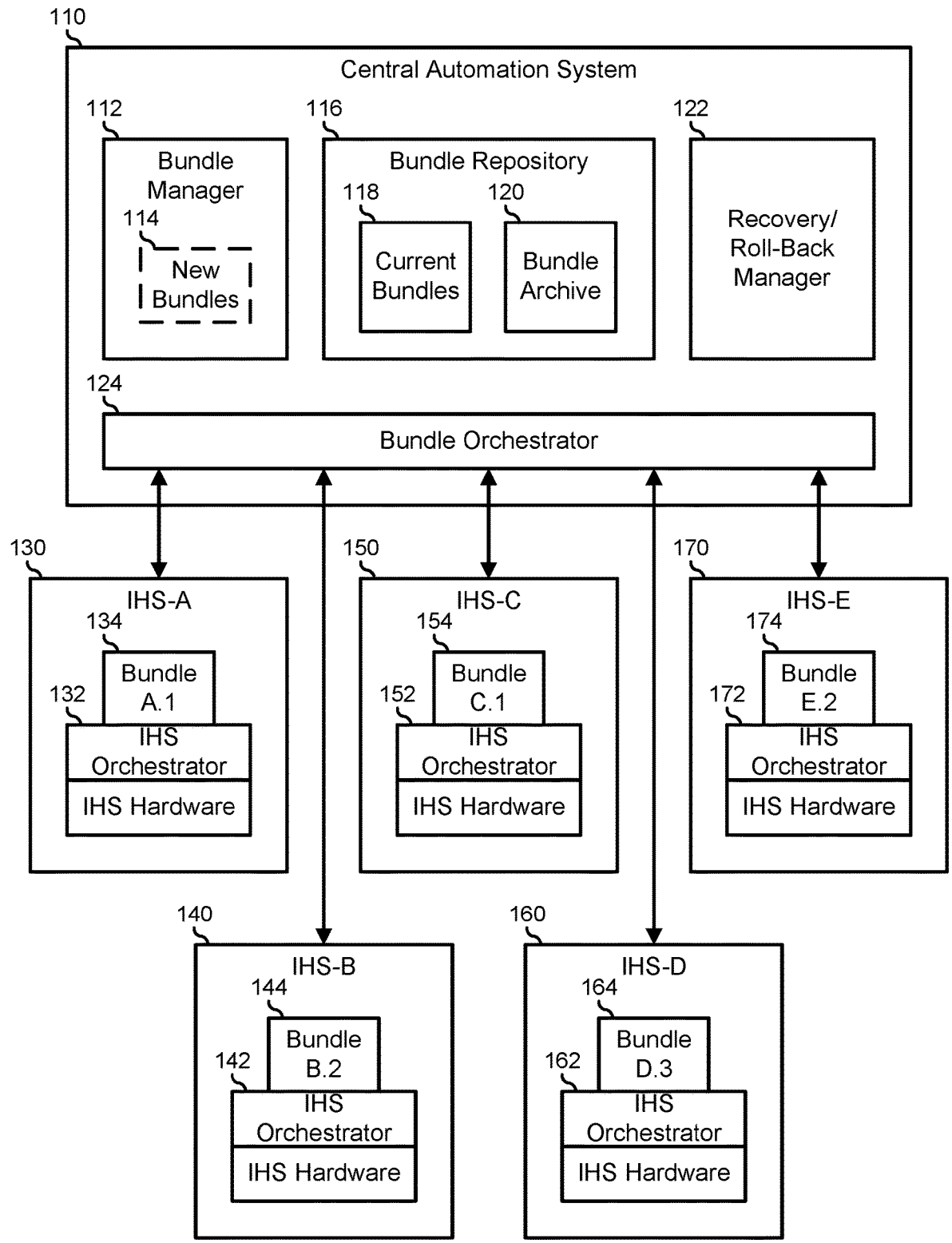
FIG. 1 is a block diagram of a distributed system according to an embodiment of the current disclosure.

FIG. 1 illustrates a distributed system 100 including a central automation system 110 and information handling systems 130, 140, 150, 160, and 170. Distributed system 100 represents a network of remote devices that are centrally monitored, managed, and maintained. An example of a distributed system may include a network of internet-of-things (IoT) devices, a datacenter, a network of switches, routers, or other fabrics, a cloud service provider, a modern office environment with multiple work-from-home systems, or the like. Distributed system 100 is characterized by the fact that the managed devices do not necessarily share a common architecture, a common usage model, a common network interconnection, or the like. Moreover, the managed devices are not necessarily separately monitored, managed, or maintained. In particular, in the IoT and work-from-home examples, the devices may be operated in an environment with little to no direct information technology (IT) support. As such, central automation system 110 operates to monitor, manage, and maintain the configuration state of information handling systems 130, 140, 150, 160, and 170, while delegating the implementation of the configuration state of each of the information handling systems to within themselves.

Typical distributed systems face several challenges in monitoring, managing, and maintaining the managed devices, including state management, device state recovery, device state rollback, lifecycle management, and a lack of formal execution environments at the device locations. A distributed system provides state management for the managed devices by providing a single source for state validation and truth for the managed devices, including the distribution of updates to the execution environment of the managed devices. Device state recovery provides the restoration of services in the event of a catastrophic failure of any of the managed devices, and may include restarting of executables and resynchronizing the executables with the state of the rest of the distributed network or the like. Device state rollback is similar to recovery, but more particularly relates to cases where the provision of an update fails. The managed system operates to restore operation to a previously known-good state. Lifecycle management ensures that critical updates are actually implemented on the managed devices, rather than depending on the individual managed devices to determine whether or not to implement critical updates.

In each of these cases, the lack of formal execution environments, meaning the state of support infrastructure and resources, means that more complex state monitoring, management, and maintenance tasks (for example state management, recovery, rollback, lifecycle, etc.) may not be completed as needed to maintain the viability of the distributed system. Further, typical distributed systems utilize a distributed database or the like to provide for the monitoring, management, and maintenance of the managed devices. A central orchestrator deploys services to the managed devices. The services typically present an application programming interface (API) back to the central orchestrator to receive the state updates and the like. However, such an approach typically requires significant processing resources of the managed device, and leaves potential vulnerabilities to malicious attack through the API. Moreover, distributed databases typically necessitate extensive efforts for maintenance and back up of the database itself.

The current embodiments provide reduced overhead on the part of the managed devices to maintain the correct state, leaving the management of the overall distributed network to the central automation system. Further, the current embodiments eliminate a common attack vector provided by the use of APIs. Moreover, the current embodiments provide for simplified recovery, rollback, and lifecycle management. A central agent, such as central automation system 110 operates to provide bundles to the managed devices.

Figure 2:
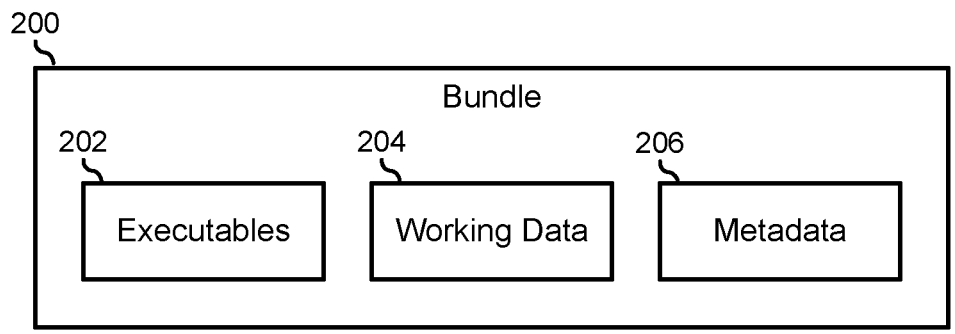
FIG. 2 is a block diagram of a bundle according to an embodiment of the current disclosure.

As used herein, a bundle represents software elements that are utilized by an information handling system orchestrator to deploy a complete state package to the associated information handling system. An exemplary bundle is shown in FIG. 2. A bundle 200 is shown as including the executables 202 that are to be deployed to the information handling system, working data 204 needed by the executables, and metadata 206 utilized in configuring the executables and the like. In a particular embodiment, bundle 200 represents a containerized data packet that is executable on container socket on an information handling system. For example, bundle 200 may represent a Docker container, a Kubernetes container, or the like. Bundle 200 may include software elements that are provided to monitor, manage, and maintain the machine state of the information handling system to which it is deployed.

For example bundle 200 may include firmware updates, including BIOS/UEFI updates for the information handling system, configuration settings for the information handling system, security patches for the information handling system, or other software elements utilized by the information handling system in maintaining the processing environment set up on the information handling system. Bundle 200 may further include software elements that are provided to monitor, manage, and maintain the processing tasks performed by the information handling system. For example, bundle 200 may include a particular application or program to be instantiated on the information handling system, or updates to an application or program that is instantiated on the information handling system, or the like. Bundle 200 may also include executables that may be used to change the configuration of other information handling equipment. For example, bundle 200 may include an orchestration framework, such as Ansible, that will change the configuration of one or more network switches being managed by the information handling system executing bundle 200.

In this regard, a particular information handling system may include more than one bundle similar to bundle 200. For example, an information handling system may include a first bundle associated with the machine state of the information handling system, and one or more additional bundles associated with different applications or programs instantiated on the information handling system. In another case, a single bundle may include elements related to setting up or maintaining the operating environment on the target information handling system, and may also include software elements related to the processing task to which the information handling system is intended. In a particular embodiment, the contents of bundle 200 (that is, executables 202, working data 204, and metadata 206) represent a software image that is instantiated on a particular managed device. The software image may include elements related to setting up or maintaining the operating environment on the target information handling system, may include software elements related to the processing task to which the information handling system is intended, or both. An example of a software image may include a cabinet file (that is, a CAB file) or the like.

Returning to FIG. 1, central automation system 110 includes a bundle manager 112, a bundle repository 116, a recovery/rollback manager 122, and a bundle orchestrator 124. Each of information handling systems 130-170 include information handling system hardware that instantiates an information handling system orchestrator 132, 142, 152, 162, and 172. Here, central automation system 110 monitors, manages, and maintains information handling systems 130, 140, 150, 160, and 160 by deploying complete, self-contained software bundles to the information handling systems. A bundle 134 is deployed to information handling system 130, a bundle 144 is deployed to information handling system 140, a bundle 154 is deployed to information handling system 150, a bundle 164 is deployed to information handling system 160, and a bundle 174 is deployed to information handling system 170.

Bundle manager 112 operates to create a new bundle 114 for deployment to one or more of information handling systems 130, 140, 150, 160, and 170. As such bundle manager 112 represents a very dynamic element of distributed system 100 that accounts for multiple elements related to the distributed system, including the purpose of the distributed system, the operating environments of information handling systems 130, 140, 150, 160, and 170, and the programs and applications instantiated thereon, security risks to the information handling systems, a validation or verification status for the operating environments, programs, and applications, or other aspects that may be needed to create new bundle 114. Thus the operation of bundle manager 112 may be highly automated based upon update releases for the operating environments, programs, and applications instantiated on information handling systems 130, 140, 150, 160, and 170, or may be a highly hands-on operation, as needed or desired.

When new bundle 114 is created, the new bundle is provided to bundle orchestrator 124 for deployment to the one or more of information handling systems 130, 140, 150, 160, and 170. Here, bundle orchestrator 124 operates to schedule the transfer of new bundle to the selected information handling systems 130, 140, 150, 160, or 170. Bundle orchestrator 124 also functions to monitor the deployments of the bundles within information handling systems 130, 140, 150, 160, and 170, and receives status information as to the health of distributed system 100 and the deployments of the bundles to the information handling systems. For example bundle orchestrator 124 may operate to detect a failure in one of information handling systems 130, 140, 150, 160, and 170 to trigger a recovery of the failing information handling system by recovery/roll-back manager 122, may detect a failed deployment of a bundle and trigger a roll-back for the information handling system by the recovery/roll-back manager, may detect lifecycle maintenance needed by one of the information handlings systems and prompt bundle manager 112 to create new bundle 114, or otherwise monitor the status of the distributed system as needed or desired.

When an information handling systems 130, 140, 150, 160, or 170 is deployed with an associated bundle 134, 144, 154, 164, or 174, the associated information handling system orchestrator 132, 142, 152, 162, or 172 executes the bundle on the information handling system hardware. For example, when bundle 134 implements an update or change to the operating environment instantiated on the information handling system hardware of information handling system 130, then information handling system orchestrator 132 operates to execute the executables included in bundle 134 to perform the update or change to the operating environment, as needed or desired. Similarly, when bundle 134 implements an update or change to a program or application instantiated on information handling system 130, then information handling system orchestrator 132 operates to execute the executables included in bundle 134 to perform the update or change to the program or application, as needed or desired.

When a new bundle is received and deployed by an information handling systems 130, 140, 150, 160, or 170, the old bundle is removed from the associated bundle orchestrator 132, 142, 152, 162, or 172. That is, a new bundle does not operate to modify the existing bundle, but rather, the new bundle completely replaces the existing bundle. However, note further that the effects of a particular bundle may or may not persist within the information handling system after that bundle is replaced. In a first case, when a new bundle is targeted to updating the operating environment of the information handling system, such as with a firmware or BIOS/UEFI update, or an application or program instantiated on the information handling system, the effects of a prior bundle may remain in effect if the new bundle and the prior bundle contain updates to different elements of the information handling system. For example, if a first bundle updates the driver for a first device and a second bundle updates the driver for a second device, then the second bundle would not be understood to change the effects of the first bundle. On the other hand, when a new bundle is targeted to an application or program instantiated on the information handling system, then the new bundle may act to update the existing install of the application or program, or to completely reinstall the application or program, as needed or desired.

In this way, distributed system 100 provides a centralized state management system in central automation system 110, but minimizes the resources of the managed devices needed to maintain the authenticated state. In particular information handling systems 130, 140, 150, 160, and 170 only need to retain a copy of their current state bundle, and the current state bundle includes the executables, data, and metadata necessary to perform the bundle's intended task. Thus the operating state of information handling systems 130, 140, 150, 160, and 170 are protected against configuration drift and malicious attacks that would otherwise be open, for example, where an API-based method of state management is utilized.

As illustrated, information handling system 130 is deployed with a version A.1 bundle 134, information handling system 140 is deployed with a version B.2 bundle 144, information handling system 150 is deployed with a version C.1 bundle 154, information handling system 160 is deployed with a version D.3 bundle 164, and information handling system 170 is deployed with a version E.2 bundle 174. The alpha character of the bundle name illustrates that the bundle is associated with the particular information handling system. In this regard, one or more information handling system may receive a common bundle. For example where distributed system 100 includes several different types of information handling systems (such as different functions, different manufacturers, or the like), then some or all of the information handling systems of a common type may receive a common bundle. The numeric character of the bundle name represents a version of the particular bundle.

Figure 3:
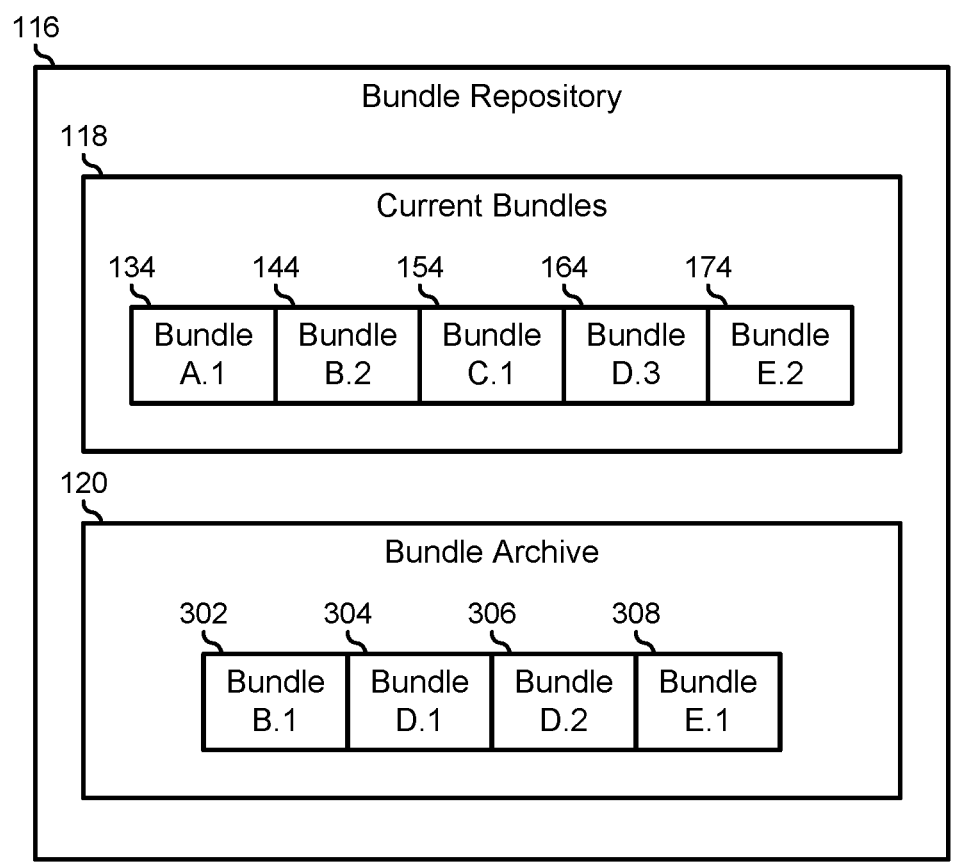
FIG. 3 is a block diagram of a bundle repository of the distributed system of FIG. 1.

Bundle repository 116 represents a data storage device that stores bundles. In particular, bundle repository 116 includes storage allocated for current bundles 118, and storage allocated for a bundle archive 120. FIG. 3 illustrates a detailed view of bundle repository 116. Current bundles 118 include A.1 bundle 134, B.2 bundle 144, C.1 bundle 154, D.3 bundle 164, and E.2 bundle 174. Bundle archive 120 includes a B.1 bundle 302, a D.1 bundle 304, a D.2 bundle 306, and an E.1 bundle 308.

When one of information handling systems 130, 140, 150, 160, or 170 experiences a catastrophic failure, recovery/roll-back manager 122 receives an indication form bundle orchestrator 124, and the recovery/roll-back manager selects the current bundle for the failing information handling system from current bundles 118, and provides the selected bundle to the bundle orchestrator for deployment to the information handling system. In a particular embodiment, information handling systems 130, 140, 150, 160, and 170 include a control bundle that operates to monitor the operating status of the information handling system. Then, when one of information handling systems 130, 140, 150, 160, or 170 experiences a failure, the control bundle operates to send a request to bundle orchestrator 124 to receive the current bundle for that information handling system, and to redeploy the current bundle to recover the information handling system back to the operational state.

Similarly, when one of information handling systems 130, 140, 150, 160, or 170 experiences a failure of a particular bundle to deploy correctly, recovery/roll-back manager 122 selects an archived bundle for the failing information handling system from bundle archive 120, and provides the selected bundle to the bundle orchestrator for deployment to the information handling system. Similar to the recovery case a control bundle may operate to detect that a particular bundle failed to deploy, and the control bundle requests a prior state bundle from bundle orchestrator 124, and redeploys the prior bundle to roll-back the information handling system to the prior state.

Figure 4:
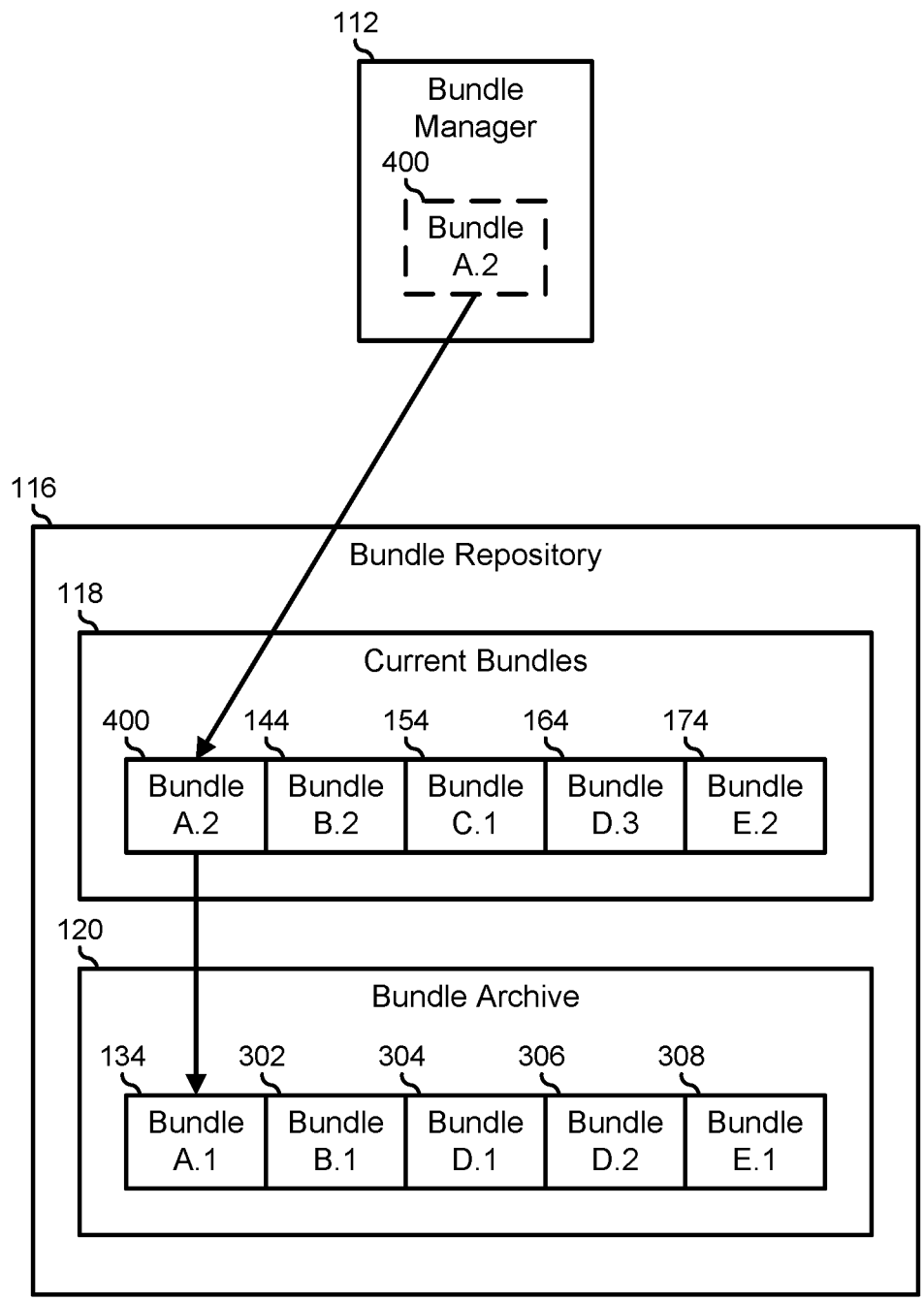
FIG. 4 illustrates the creation of a new bundle on the distributed system of FIG. 1.

FIG. 4 illustrates the deployment of a new A.2 bundle 400. Bundle manager 112 creates A.2 bundle 400 which replaces A.1 bundle 134 in current bundles 118, and the A.1 bundle is moved to bundle archive 120. In a particular embodiment, when either a catastrophic failure of one of information handling systems 130, 140, 150, 160, or 170 occurs and a bundle recovery is needed, or a particular bundle fails to execute and a roll-back is needed, the associated information handling system orchestrator 132, 142, 152, 162, or 172 is configured to request the replacement of the current bundle (recovery) or the return of the previous bundle (roll-back), as needed or desired. In some embodiments, the bundle archive 120 may retain multiple copies of previous bundles.

Figure 5:
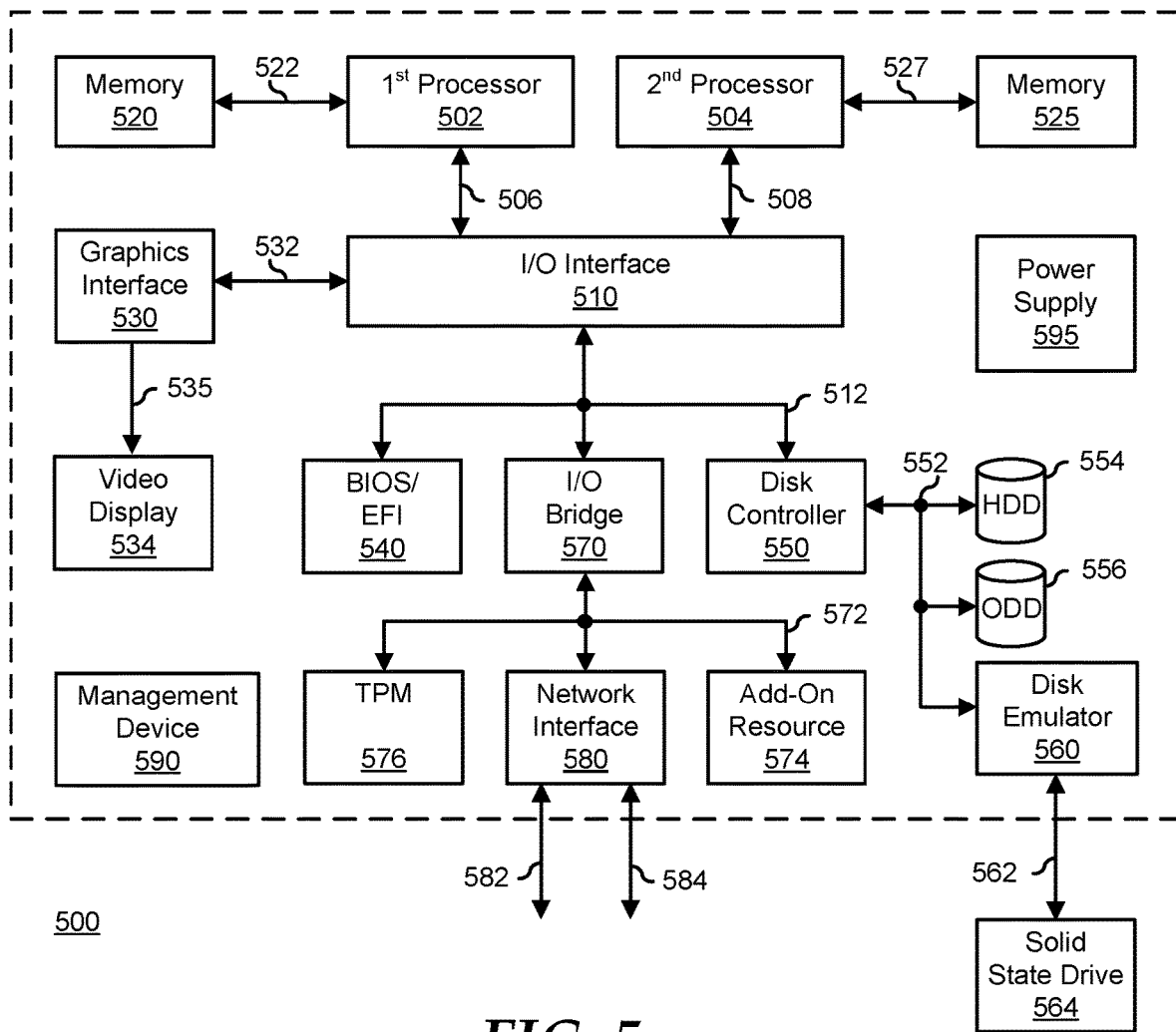
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520 and 525, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 535 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on a separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system for monitoring, managing, and maintaining a distributed network of information handling systems, the system comprising:
    a first information handling system configured to create a first software bundle; and
    a second information handling system configured to receive the first bundle from the first information handling system, and to execute a first executable included in the first bundle, the first executable to change a configuration of the second information handling system from a first operating state to a second operating state;
    wherein the first information handling system is further configured to determine that the second information handling system has suffered a failure not related to the first bundle, and in response to direct the second information handling system to restart and to send a second bundle to the second information handling system, the second bundle being a prior version of the first bundle.

2. The system of claim 1, wherein, in further response to determining that the second information handling system has suffered the failure not related to the first bundle, the information handling system is further configured to direct the second information handling system to restart and to resend the first bundle to the second information handling system.

3. The system of claim 1, wherein the first operating state is associated with a second bundle executed by the second information handling system.

4. The system of claim 3, wherein, in further response to determining that the second information handling system has suffered the failure related to the first bundle, the information handling system is further configured to direct the second information handling system to restart and to send the second bundle to the second information handling system.

5. The system of claim 1, wherein the first executable operates to change at least one of a BIOS/UEFI of the second information handling system, a firmware element of the second information handling system, a driver of the second information handling system, a configuration of a network switch, and a configuration of a storage array.

6. The system of claim 1, wherein the first and second operating states are associated with a program instantiated on the second information handling system.

7. The system of claim 1, further comprising:
    a third information handling system configured to receive a third bundle from the first information handling system, to execute a second executable included in the third bundle, the third executable to change a configuration of the third information handling system from a first operating state to a second operating state.

8. The system of claim 1, wherein the second information handling system instantiates a containerization system to deploy the first bundle.

9. The system of claim 1, wherein the first bundle further includes data utilized by the first executable, and metadata utilized to configure the first executable.

10. A method for monitoring, managing, and maintaining a distributed network of information handling systems, the method comprising:

creating, on a first hardware information handling system, a first software bundle;

receiving, by a second hardware information handling system, the first bundle from the first information handling system;

executing a first executable included in the first bundle, the first executable to change a configuration of the second information handling system from a first operating state to a second operating state;

determining, by the first information handling system, that the second information handling system has suffered a failure not related to the first bundle;

directing the second information handling system to restart in response to the determining; and sending a second bundle to the second information handling system, the second bundle being a prior version of the first bundle.

11. The method of claim 10, further comprising:

determining, by the first information handling system, that the second information handling system has suffered a failure not related to the first bundle;

directing the second information handling system to restart in response to the determining; and resending the first bundle to the second information handling system.

12. The method of claim 10, wherein the first operating state is associated with a second bundle executed by the second information handling system.

13. The method of claim 12, in further response to the determining, the method further comprising:

directing the second information handling system to restart in response to the determining; and sending the second bundle to the second information handling system.

14. The method of claim 10, wherein the first executable operates to change at least one of a BIOS/UEFI of the second information handling system, a firmware element of the second information handling system, a driver of the second information handling system, a configuration of a network switch, and a configuration of a storage array.

15. The method of claim 10, wherein the first and second operating states are associated with a program instantiated on the second information handling system.

16. The method of claim 10, further comprising:

receiving, by a third hardware information handling system, a third bundle from the first information handling system; and executing a second executable included in the third bundle, the second executable to change a configuration of the third information handling system from a first operating state to a second operating state.

17. The method of claim 10, wherein the second information handling system instantiates a containerization system to deploy the first bundle.

18. A system for managing a distributed network, the system comprising:

a first information handling system configured to create a software bundle;

a second information handling system configured to receive the bundle from the first information handling system, and to execute an executable included in the bundle, the executable to change a configuration of the second information handling system from a first operating state to a second operating state; and a third information handling system configured to receive the bundle from the first information handling system, and to execute the executable to change a configuration of the third information handling system from a third operating state to a fourth operating state;

wherein the first information handling system is further configured to determine that the second information handling system has suffered a failure not related to the first bundle, and in response to direct the second information handling system to restart and to send a second bundle to the second information handling system, the second bundle being a prior version of the first bundle.

* * * * *